INVENTOR.
WILLIAM LUDLOW SCHUMACHER

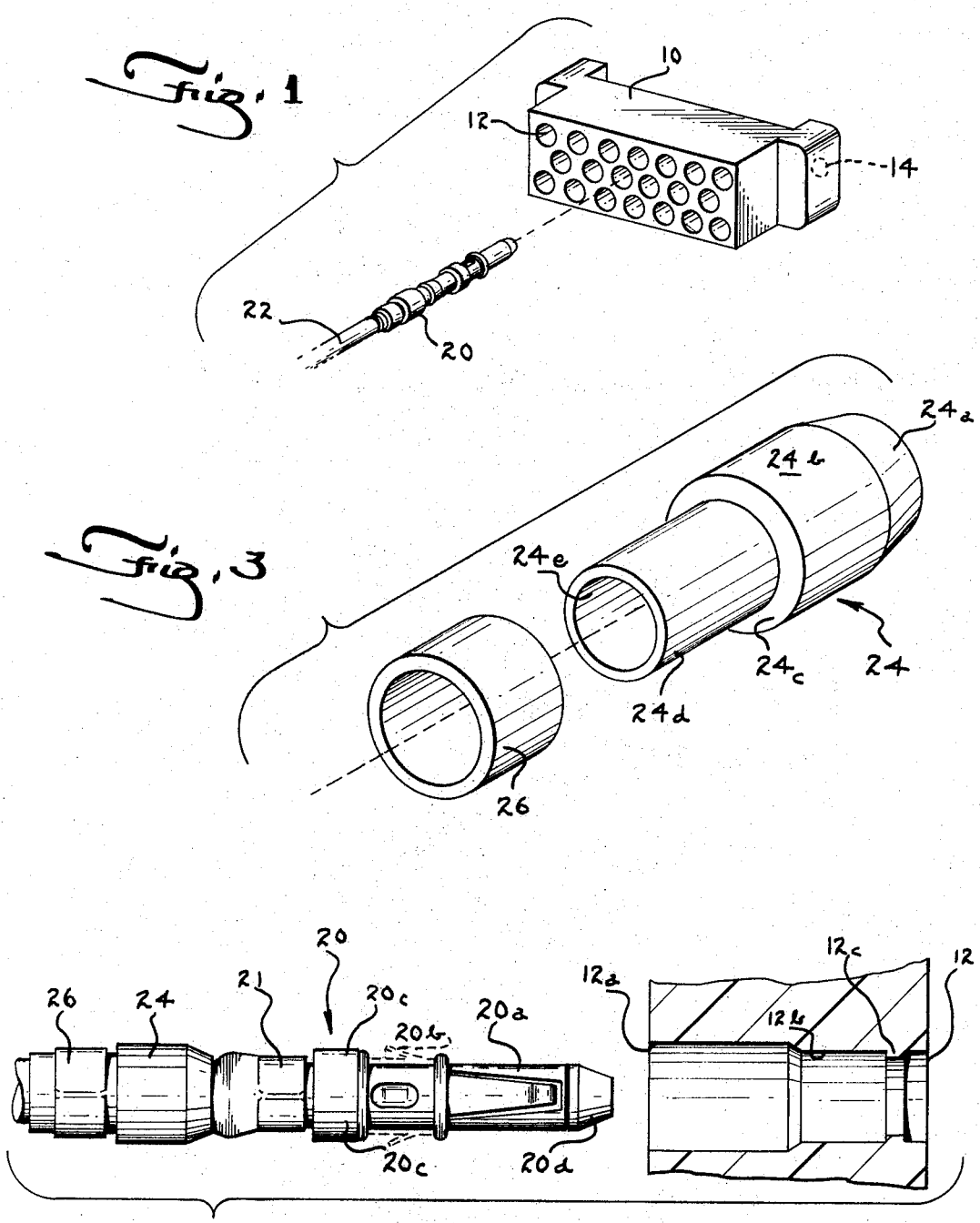

United States Patent Office 3,328,746
Patented June 27, 1967

3,328,746
CONNECTOR SEAL AND SUPPORT
William Ludlow Schumacher, Camp Hill, Pa., assignor to AMP Incorporated, Harrisburg, Pa.
Filed Aug. 3, 1964, Ser. No. 387,007
2 Claims. (Cl. 339—94)

This invention relates to a seal and support structure for connectors.

The expanding use of electronic equipment in vehicles, aircraft and ships has brought into use multiple connector blocks to permit an easy installation and replacement of components by a common disconnect of the many leads needed to link such components to power supplies and to instrumentation or other equipment served by such gear. Typically, connector blocks are mounted in an exposed position relative to component housings or cabinets and the leads carried thereby are subject to the effects of environment to a greater extent than the housed equipment. For example, in airborne equipment the leads at the entry point to a connector block are subject to vibration caused by lengths of leads which are free to move between the closest point of tie-down and entry into the connector. Moisture, unwanted gases, dust, dirt and other contamination which may be present on the lead input side of a connector can find a way into the protective housing or cabinet through the entry point of the leads through the connector. Additionally, in certain equipments the leads may be expected to pass from or between chambers which are maintained at different pressures which will of course accelerate entry of harmful contaminates not only into components but also onto points of contact within the connector block. Accordingly, it is an object of the invention to provide an improved connector which is sealed against the entry of contaminants through or around a connector relative to the receptacle in which it is mounted.

It is a further object to provide a light weight and simple seal structure adapted to withstand moderate pressure differentials.

It is yet a further object of the invention to provide a simple and inexpensive seal means which may be adapted for use with coaxial cable connectors in multiple connector blocks.

It is another object of the invention to provide a connector support means which serves to isolate the vibrations from unsupported spans of cable into the contact areas of a connector relative to a connector block.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

In the drawings:

FIGURE 1 is a perspective depicting a multiple connector block positioned to receive a coaxial connector therein incorporating the improved seal of the invention;

FIGURE 2 is a longitudinal view of a connector bearing the seal construction of the invention positioned relative to a receptacle shown in section;

FIGURE 3 is an exploded view of the improved seal construction of the invention in perspective;

Figure 4:
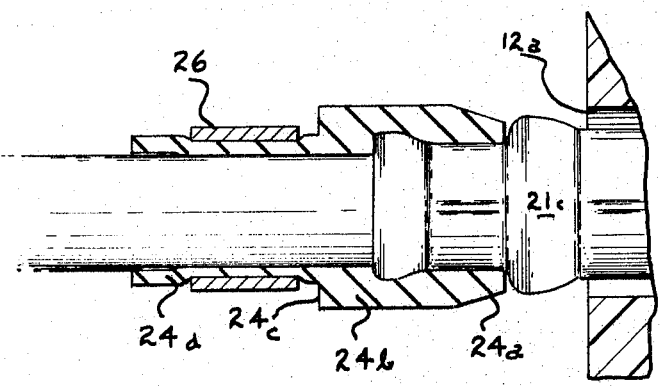
FIGURE 4 is a partially sectioned view showing the mounting of the seal construction of the invention relative to a connector and to a receptacle.

Referring now to FIGURE 1, element 10 represents a multiple connector block of standard construction including a series of apertures 12 and on the ends, mounting apertures 14 adapted to receive means to hold the block to a component chassis or to another connector block. Positioned for insertion in one of the apertures 12 is a coaxial connector 20 which terminates a coaxial lead 22. The details of the connector 20 are indicated in FIGURE 2 to include a forward end 20a having a spring means 20b adapted to cooperate with an inner flange 12c of the block to latch the connector therein. Spaced to the rear of portion 20a is a flange 20c and to the rear of that a ferrule 21 which terminates the outer braid of cable 12 to the outer shell of the connector. Within connector 20 is a dielectric, the end being shown as 20d which houses and supports a center pin member attached to the conductor of lead 22.

Figure 5:
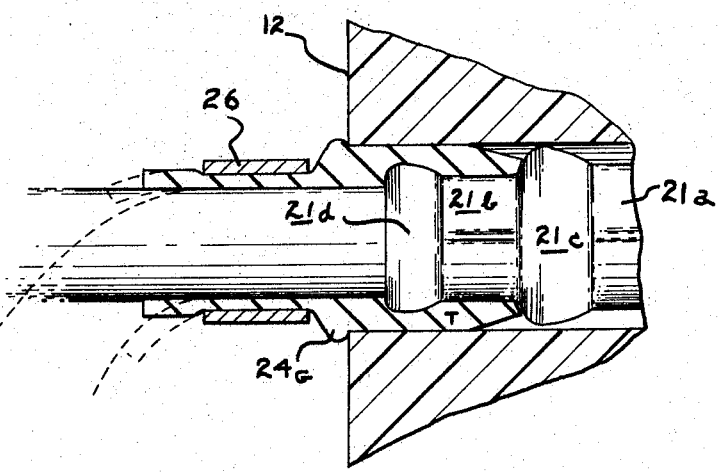
FIGURE 5 is a view showing the seal construction of the invention in section secured to and sealing a connector relative to a receptacle.

In FIGURES 4 and 5 the rear portion of the ferrule is shown to include two crimp zones 21a and 21b which are formed inwardly to leave outward portions 21c and 21d which are close to the undeformed dimension of the ferrule; i.e., the configuration of the ferrule prior to the crimping operation. The crimp of 21 is typical of crimps presently in use in the industry.

Referring now to FIGURE 3, the seal and support of the invention is comprised of a grommet member 24 and a ferrule 26. Member 24 includes a forward beveled portion 24a which serves to facilitate the entry of the seal within the receptacle portion 12a; a body portion 24b, which extends for a length at a diameter approximating in its relaxed state, the diameter of portion 12a of the receptacle. Joining 24b is a step forming a vertical portion 24c and a portion of reduced diameter 24d which is adapted to extend back along the cable lead 22. Member 24 has an inner diameter bore 24e which extends through the body thereof and is of a diameter to slidingly fit over the outer diameter of the cable or lead 22. In certain cable constructions this outer diameter is defined by metallic braid or tubing and in other and more typical cable constructions the outer diameter is defined by a sheath of insulating and weather-proofing material over the cable shielding.

Preferably, 24 is constituted of a relatively resilient rubber like material. The required characteristics of such material will be better appreciated from the description of the use and function to be described relative to FIGURES 4 and 5. The ferrule 26 is constituted of a soft metal which is malleable and is of a thickness such as to maintain structural integrity without relaxing following being crimped or deformed to the configuration shown in FIGURE 2. Ferrule 26 is of a length to maintain a seal when 22 is bent as depicted in FIGURE 5. In use, the seal assembly of the invention is made up with the ferrule 26 positioned over portion 24d and worked up close to the flange 24c.

Prior to assembly of the connector 20 on a lead and the stripping preparation necessary for such, the grommet member 24 with the ferrule 26 thereon and uncrimped is positioned back on the lead. Then following stripping of the cable and securing of the connector thereon, the seal is moved forward into the position shown in FIGURES 2 and 4 and the ferrule 26 is crimped inwardly to compress a portion 24d of the seal against the lead. An O crimp is preferably used for this to define an annular compression extending full round the surface of 24d to seal the lead around its periphery along the full length of the ferrule 26. This operation does not serve to deform, compress or otherwise affect the forward portion 24b of the member 24, nor does it substantially compress the dielectric of the lead. At this point, however, since 24 is positioned over the rear portion of the ferrule 21 of the connector, the forward portion of the inner bore 24e is somewhat stretched to deform to the configuration of such ferrule. There is then an effective seal between the inner surface of the grommet member 24 and the outer surface of the connector ferrule, as indicated in FIGURE 4. The volume of ferrule 21 serves then to expand the member 24 to a diameter larger than that of the aperture portion 12a at least in the rearward portions apart from the beveled portion 24a. With the assembly mounted as shown in FIGURE 4, the connector may then be plugged into the receptacle to the position shown in FIGURE 5. This is accomplished by poking the end of the connector within the receptacle portion 12a and then working with a slight twisting motion portion 24a within the lip of the receptacle and following through with a full insertion until 20b latches on 12c preferably with a twisting motion of the connector to the position shown in FIGURE 5. Because of the expansion of 24 by the ferrule assembly of the connector a lip or bulged portion is formed in the elastic material of 24 as indicated by 24g in FIGURE 5.

The ferrule 26 serves to seal against entry of contaminants along the outside of the lead and the compression of 24 serves to seal against entry from a point proximate the opening of 12 as well as provide isolation from vibration and bending movements of the connector lead by supporting the connector and lead.

With the connector mounted as in FIGURE 5, there is a portion of the member 24 shown as T, which is very considerably compressed and which would be necessarily further compressed by relative movements of 21 to 24 to thus hold the member together. Further, ferrule 26 in holding the portion 24d into tight compression with the lead prevents backward movement of the seal relative to the connector in this position.

As an important point, if the lead is forced to an angular entry relative to the block, the ferrule 26, will operate to prevent 24e from opening up to breach the seal. This is indicated by the dotted line in FIGURE 5.

In an actual embodiment of the grommet 24 was comprised of Viton and the ferrule 26 was comprised of tin plated annealed copper. The assembly was found to be secure against modest pressure differentials and to effectively seal and support a connector and isolate such from typical environments faced by airborne equipment.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. In a connector assembly a connector block having a plurality of apertures therein extending from one side of said block through to the other side of said block, each of said apertures being adapted to receive a connector inserted therein and including means to engage and lock said connector within said block, a plurality of connectors for said block each including means thereon to engage portions of said aperture to latch said connectors in said block and each including at a rear thereof a crimped ferrule member having an outer configuration including an enlarged annular portion and adjacent thereto a portion of reduced diameter relative to said enlarged annular portion, the said connector having a length relative to said aperture such that when a connector is inserted and locked within said block said ferrule is positioned within said aperture near said one side, a seal member of resilient material affixed to each said connector and extending therearound, said seal member including a forward enlarged portion having a beveled forward end of a diameter less than the diameter of said aperture whereby to guide said seal member in insertion within said aperture and adjacent thereto having a larger diameter adapted to be compressed radially upon insertion of said seal within said block as mounted on said connector, the rear annular enlarged portion of said ferrule of said connector serving to compress the material of said seal member against the walls of said aperture with the forward portion of said seal member fitting in and against the surface of the depressed portion of said ferrule, the rear portion of said seal member including a sleeve of reduced diameter extending out over the lead of said connector outboard of said block, a second ferrule member crimped inwardly around the periphery of said portion of reduced diameter to seal the inside of said seal member against the environment on one side of said block, the forward portion of said seal member operating to seal the outside of said forward portion of said seal against the environment on one side of said block whereby to protect the contact portions of said connector against the environment on one side of said block and to seal the other side of said block from the one side of said block.

2. In a sealed connector assembly a connector block having at least one aperture therethrough extending from one face to the other face of said block, the said aperture being adapted to receive a connector inserted therein, the aperture of said block having in one end a projecting portion adapted to cooperate with a connector to latch said connector in said block against axial displacement, a connector joined to a lead and having means thereon adapted to engage said portion of said aperture to latch said connector in said block, a seal member adapted to be fitted around said connector at an end opposite to said means for latching said connector in said block, said seal member being comprised of resilient material having a rear sleeve portion of an inner diameter approximating the diameter of the lead of said connector, said portion extending out along the said lead, out of said block, a ferrule member adapted to be fitted over the said rear portion of said seal member and deformed therein around the periphery of the rear portion to compress such in against the outer surface of the lead to provide a seal between the environment on the side of said block from which said connector is inserted and inner portions of said seal member, the forward portion of said seal member having a material thickness relative to an inner bore thereof and to portions on said connector so as to be expanded outwardly in position on the connector to a diameter slightly larger than the aperture of the block, the said seal member being positioned on said connection to be substantially compressed along the length of the forward portion thereof against the walls of the said aperture, thereby sealing the forward portions of the connector and the side of said block having said other face against the environment on the one side of said block, and there is included at the rear portion thereof a second ferrule crimped inwardly to terminate said connector to the said lead, the said second ferrule being crimped to define an outward annular bulge positioned to be engaged by the inner surface of the forward portion of said seal member with the forward portion of the seal member extending forwardly thereof into a depressed portion on said second ferrule whereby to trap portions of said seal member in compression against the walls of said aperture.

References Cited

UNITED STATES PATENTS

| | | | |
|---|---|---|---|
| 2,758,291 | 8/1956 | Richards | 339—94 |
| 2,911,460 | 11/1959 | Oxley. | |
| 3,009,130 | 11/1961 | Redslob et al. | 339—176 |
| 3,015,683 | 1/1962 | O'Keefe et al. | |
| 3,098,688 | 7/1963 | Crimmins et al. | 339—223 |

MARVIN A. CHAMPION, *Primary Examiner.*

J. H. McGLYNN, *Assistant Examiner.*